P. G. RAPP & P. H. KING.
NUT LOCK.
APPLICATION FILED JAN. 11, 1911.
1,019,277.
Patented Mar. 5, 1912.
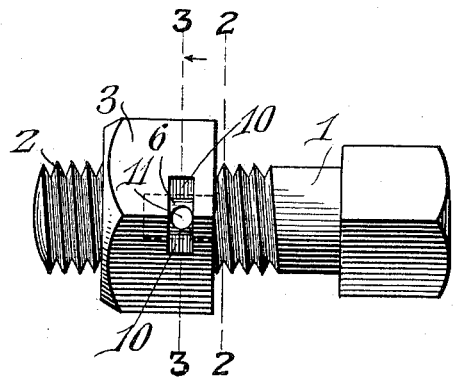
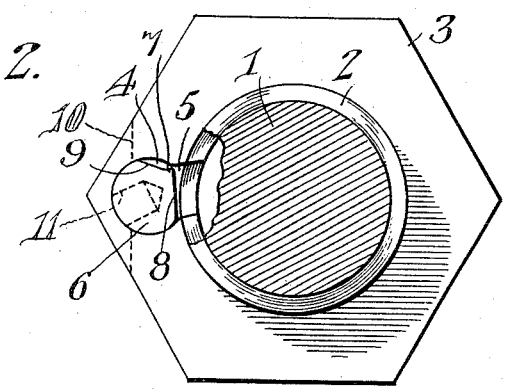
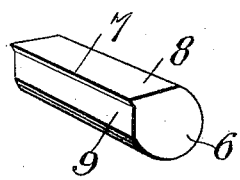
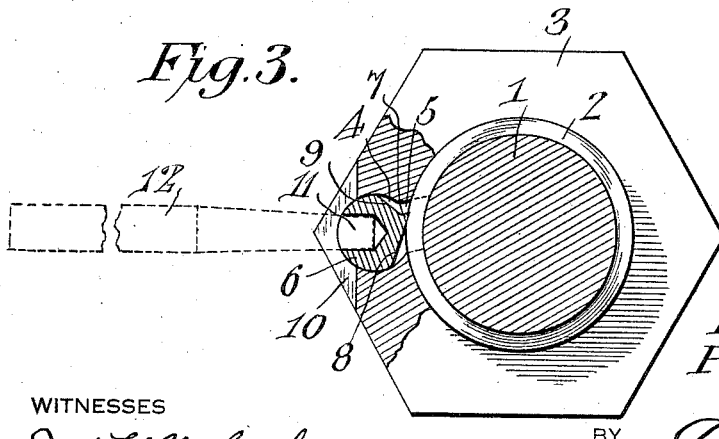
Peter G. Rapp
Peter H. King
INVENTORS
WITNESSES
BY
ATTORNEY

UNITED STATES PATENT OFFICE.

PETER G. RAPP AND PETER H. KING, OF CHICAGO, ILLINOIS.

NUT-LOCK.

1,019,277.  Specification of Letters Patent.  Patented Mar. 5, 1912.

Application filed January 11, 1911. Serial No. 602,040.

*To all whom it may concern:*

Be it known that we, PETER G. RAPP and PETER H. KING, citizens of the United States, residing at Chicago, in the county of Cook and State of Illinois, have invented a new and useful Nut-Lock, of which the following is a specification.

This invention has reference to improvements in nut locks, and its object is to provide a device for the purpose requiring a minimum change in an ordinary nut, but which change may be readily made in existing nuts, or the nuts may be readily formed in the course of manufacture to adapt them to the present invention.

In accordance with the present invention there is provided a nut having a seat or socket at one side of the threaded bore of the nut and opening thereinto and on the side of the seat remote from the threaded bore of the nut it is entered by a slot which may be readily formed by an ordinary milling tool, the purpose of the slot being to admit of a manipulating pin to turn a dog lodged in the seat in a manner to cause a tooth on the dog to bite into the threads on the shank of the bolt when the nut has been screwed thereon to the proper extent and it is desirable to lock the nut against movement tending to unscrew it. At the same time the designed unscrewing of the nut is readily brought about by the use of the manipulating pin, which will draw the dog out of engagement with the threads on the bolt and the nut may be then unscrewed or, if desired, the nut may be screwed tighter at any time, the screwing of the nut on the bolt rendering the dog then inactive, but the latter may be brought into active position by the proper application of the manipulating pin.

The invention will be best understood from a consideration of the following detailed description, taken in connection with the accompanying drawings forming a part of this specification, with the understanding, however, that while the drawings illustrate an operative form of the invention, the latter is not confined to the exact details of construction illustrated.

In the drawings:—Figure 1 is a side view of a bolt with the nut provided with the improved nut lock applied thereto. Fig. 2 is a section on the line 2—2 of Fig. 1 but drawn to an enlarged scale. Fig. 3 is a section similar to that of Fig. 2, but with a part of the nut in section on the line 3—3 of Fig. 1. Fig. 4 is a perspective view of the locking dog on substantially the same scale as Figs. 2 and 3.

Referring to the drawings, there is shown a bolt 1 which may be considered as typical of any threaded rod, stud or bolt designed to receive a nut, the threaded portion of the bolt being indicated at 2, and the nut adapted to such threaded portion of the bolt being indicated at 3. It will be observed that the nut is shown as of the usual hexagonal type, but the invention is not necessarily limited to this particular type of nut.

There is produced in the body of the nut at one side of the central threaded portion of the nut a cylindrical recess or seat 4 opening at the engaging face of the nut and extending thereinto in parallel relation to the longitudinal axis of the nut for an appropriate distance, say anywhere from one-half to three-fourths the depth of the nut, but this distance may vary from the particular relation mentioned. In the particular instance shown, the recess 4 has its center line radial to the longitudinal axis of the nut and cutting one of the angles of the hexagonal exterior to the nut, and while this is a preferred location, the seat or recess 4 may be otherwise located.

At one side of the seat or recess 4 there is formed a passage 5 opening into the interior or bore of the nut and of substantially the same length as the recess 4, but of less diameter than the said recess. The seat 4 is designed to receive a dog 6 of general cylindrical form, which dog is of a length to wholly seat in the recess 4 and is of a diameter to closely and yet freely fit in the seat 4, so as to turn about the longitudinal axis of said seat.

Along one side the dog 6 is formed with a longitudinal tooth 7 and on each side of this tooth the periphery of the dog may be flattened as indicated at 8 and 9, respectively, although this particular construction is not mandatory. The dog 6 may be formed from an appropriate shaped rod or may be rolled or pressed into shape, or may be formed in any appropriate manner, but the tooth 7 need not extend beyond the periphery of the dog if the periphery be considered as circular throughout its circumferential extent, for the projection of the tooth is ample since the inner walls of the seat 4 may be so related to the bore of the nut as to enter such bore for a short distance were the said walls continued across the passage 5.

That side of the seat 4 remote from the bore of the nut is entered by a transverse slot 10 which may consist of a simple channel of considerably less width than the length of the seat 4, although the relative proportions may be varied within wide limits. The dog 6 is provided on the side remote from the tooth 7 with a socket 11, which, when the dog is properly seated in the recess 4 is coincident with the slot 10, and this socket 11 is designed to receive one end of a manipulating pin indicated in dotted lines 12 in Fig. 3, the pin being passed through the slot 10 and into the socket 11, when by a movement in the direction of the length of the slot 10 transversely of the seat 4 the dog may be rocked on its longitudinal axis sufficiently for the purposes of the present invention.

Let it be assumed that the nut 3 has been screwed upon the threaded end 2 of the bolt or like device to the proper extent, and it is desirable to then lock the nut against rotation in the opposite direction which will tend to loosen the nut. When the nut is applied to the threaded end 2, the dog 6 may be already seated in the recess 4, but there is no tendency to rotate the dog when the nut is being screwed to its proper position, and in fact the nut may be screwed in either direction at will without interference from the dog. However, after the nut has been screwed to the position desired, the pin 12 is inserted in the socket 11 of the dog and the said socket is then rocked on its longitudinal axis in the desired direction to bring the tooth 7 into engagement with the threads of the bolt, the slot 10 being long enough to permit such action of the pin and dog. The result of this is that the tooth 7 is forced into the exposed threads at the passage 5, since these threads are then in the path of rotative movement of the tooth 7, and the said tooth 7 sinks more or less into the edges of the threads and the dog becomes locked to the threads, in turn locking the nut against reverse turning, which latter movement only tends to sink the tooth of the dog deeper into the threads of the bolt. This will be apparent from an inspection of Fig. 3 where the movement of the nut in unscrewing from the bolt is clockwise, and while the angle of the tooth 7 to the threads is such that this tooth will not spontaneously bite into the threads on the unscrewing movement of the nut, it may be made to bite into the threads by turning the dog 6 also in a clockwise direction as viewed in Fig. 3, so that the tooth 7 is caused to bite into the threads of the bolt and then a further rotative movement of the nut to unscrew from the bolt will only tend to more firmly engage the dog with the threads of the bolt. Should it be desirable to loosen the nut, it is only necessary to move the nut in the direction to screw it on to the bolt if there be space for such movement, and this will loosen the dog from the threads of the bolt, or the dog may be loosened by a proper use of the pin 12, to rotate the dog in a counter-clockwise direction, so that the tooth 7 is moved out of active relation to the threads of the bolt and the nut may then be moved in either direction at will without interference from the dog.

What is claimed is:—

1. In a nut lock, a nut provided with a longitudinal recess parallel to and encroaching upon the central threaded bore of the nut, the recess open to one end face of the nut and closed at the other end, and a pawl of general cylindrical shape to seat within the recess and cut away upon intersecting planes generated by lines parallel to the axis of the cylinder to form a longitudinal tooth confined within the cylindrical periphery of the pawl, the pawl also provided on the side opposite the tooth and intermediate its ends with a socket, the said nut having a slot formed through its outer wall cutting the recess transversely in line with the socket and on the side remote from the bore of the nut.

2. In a nut lock, a nut provided with a longitudinally disposed seat or recess parallel with and at one side of the threaded bore of the nut, said seat or recess extending from one end face of the nut toward but terminating short of the other end face of the nut and opening into the threaded bore of the nut, the said nut being provided with a slot or passage leading from the cylindrical seat to the exterior of the nut intermediate of the ends of the nut, said slot extending to each side of the seat and entering the same at a point remote from the point of communication of the seat with the bore of the nut, and a cylindrical pawl having a tooth formed along one side thereof, said pawl being adapted to the cylindrical seat in the nut with the tooth in position to enter the bore of the nut through the passage connecting the seat with said bore and said pawl being provided with a socket on the side remote from the tooth in position to be entered by a manipulating member introduced through the intermediate slot in the nut.

3. In a nut lock, a nut provided with a longitudinally disposed cylindrical seat opening at one end face of the nut at one side of and communicating with the threaded bore of the nut with the longitudinal axis of the seat less distant from the corresponding side of the bore of the nut than the radius of said seat, and a cylindrical dog having a tooth along one side within the confines of the cylindrical periphery of the dog, the said dog being adapted to the seat with the tooth movable into the bore of the nut and having walls on either side of the tooth flattened, and the dog being provided on the side remote from the tooth with a socket for the introduction of a manipulating tool, the said nut having formed therein a slot or recess intermediate of the end faces of the nut and entering the cylindrical seat or socket on the side thereof remote from the bore of the nut.

In testimony, that we claim the foregoing as our own, we have hereto affixed our signatures in the presence of two witnesses.

PETER G. RAPP.
PETER H. KING.

Witnesses:
JOSEPH R. SHINNICK,
JULIUS CUNRADO.

Copies of this patent may be obtained for five cents each, by addressing the "Commissioner of Patents, Washington, D. C."